United States Patent
Liao

(10) Patent No.: US 8,456,811 B2
(45) Date of Patent: Jun. 4, 2013

(54) CASING HAVING LOCAL PORTION ADJACENT TO WIRELESS DEVICE

(75) Inventor: Wei Yu Liao, Zhang Hua (TW)

(73) Assignee: Kunshan Tong-Yin Industrial Electronics Making Co., Ltd., Kunshan, Jiangsu Prov. (CN)

( * ) Notice: Subject to any disclaimer, the term of this patent is extended or adjusted under 35 U.S.C. 154(b) by 317 days.

(21) Appl. No.: 12/909,190

(22) Filed: Oct. 21, 2010

(65) Prior Publication Data

US 2011/0102985 A1 May 5, 2011

(30) Foreign Application Priority Data

Oct. 29, 2009 (CN) ...................... 2009 2 0257321 U

(51) Int. Cl.
*H05K 7/14* (2006.01)
(52) U.S. Cl.
USPC ................ 361/679.01; 361/816; 361/818
(58) Field of Classification Search
USPC ............. 361/679.01, 679.02, 679.09, 679.08, 361/679.21, 679.27, 816, 818; 174/35 R, 174/35 GC
See application file for complete search history.

(56) References Cited

U.S. PATENT DOCUMENTS

| | | | |
|---|---|---|---|
| 5,373,101 A * | 12/1994 | Barabolak | 174/363 |
| 2008/0264663 A1 * | 10/2008 | Meyer et al. | 174/36 |
| 2009/0130995 A1 * | 5/2009 | Wang Chen | 455/90.3 |

* cited by examiner

*Primary Examiner* — Jinhee Lee
*Assistant Examiner* — Ingrid Wright
(74) *Attorney, Agent, or Firm* — McClure, Qualey & Rodack, LLP

(57) ABSTRACT

A casing includes a main body made of a conductive composite material and a local portion located adjacent to a wireless device. The local portion has a non-conductive layer and a conductive composite material layer. The thickness of the conductive composite material layer is thinner than that of the main body that is immediately adjacent to the conductive composite material layer. Signal emitting and signal receiving of the wireless device is not affected by the thickness of the conductive composite material layer of the local portion. The part of the local portion that has a thickness thinner than a thickness of the adjacent main body is installed with the non-conductive layer. The non-conductive layer is tightly connected with the conductive composite material layer of the local portion and the main body that is immediately adjacent to the non-conductive layer.

4 Claims, 5 Drawing Sheets

3C

CASING HAVING LOCAL PORTION ADJACENT TO WIRELESS DEVICE

BACKGROUND OF THE INVENTION

1. Field of the Invention

The present invention relates to a casing having a local portion adjacent to a wireless device, especially to a casing having a local portion located by a wireless device to improve signal emitting and signal receiving of the wireless device.

2. The Prior Arts

An electronic product, such as a notebook computer and a mobile phone, often adopts a conductive composite material for manufacturing its casing. Among the conductive composite materials, the carbon fiber has high efficiency of heat dissipation, high strength and excellent shield effect. Moreover, the strength of the carbon fiber is almost as good as that of a metal material. The carbon fiber is not a metal material but it is conductive, so the heat dissipation effect is almost the same as or similar to the metal material. Because the carbon fiber is a conductive material, it has an excellent shield effect. The shield effect of the carbon fiber is better than that of the ABS construction plastics and polycarbonate. The carbon fiber can block electromagnetic interferences and thus the carbon fiber is suitable for fabricating the casing of the notebook computer or the mobile phone. However, the carbon fiber is a conductive member which will generate a shield effect to electromagnetic waves, so the signal receiving and signal emitting of the notebook computer or the mobile phone would be affected.

SUMMARY OF THE INVENTION

A primary objective of the present invention is to provide a casing having a local portion adjacent to a wireless device, which overcomes aforementioned disadvantages of the conventional designs. In order to achieve the objective, a casing having a local portion adjacent to a wireless device according to the present invention includes a main body and a local portion that is located by the wireless device. The local portion has a conductive composite material layer. The thickness of the conductive composite material layer is shorter than the adjacent area, and the shortened portion is replaced with a non-conductive material. As such, not only the shield effect of the conductive composite material to electromagnetic interferences is reduced, but the thickness and the strength of the local portion are also kept.

According to a first embodiment of the present invention, a casing includes a main body made of a conductive composite material and a local portion located by a wireless device. The local portion has a conductive composite material layer. The thickness of the conductive composite material layer of the local portion is thinner than that of the main body that is immediately adjacent to the conductive composite material layer. And signal emitting and signal receiving of the wireless device is not affected by the thickness of the conductive composite material of the local portion. The thickness-reduced portion of the local portion is installed with a non-conductive layer. The non-conductive layer is tightly connected with the conductive composite material layer of the local portion and the main body that is immediately adjacent to the non-conductive layer. As such, the thickness of the conductive composite material layer of the local portion is shortened, and the thickness-shortened portion is replaced with a non-conductive material. So not only the desired thickness and strength of the local portion are kept, but the shield effect of the conductive composite material to wireless signals is also reduced.

According to a second embodiment of the present invention, the local portion does not have any conductive composite material layer and is completely composed by the non-conductive layer. In other words, the thickness of the conductive composite material layer is reduced to zero, and is completely replaced with the non-conductive layer.

The local portion includes the non-conductive layer and the conductive composite material layer. So a certain thickness of the conductive composite material layer of the local portion is reduced, and the reduced portion is replaced with the non-conductive layer.

The total thickness of the local portion is the same as or similar to the thickness of the adjacent main body.

The conductive composite material is carbon fibers.

The advantages of the present invention are described as follows. The local portion, which is adjacent to the wireless device, makes the thickness of the conductive composite material layer defined in the local portion be shortened. Thus, the shield effect of the conductive composite material to wireless signals is reduced. The thickness-shortened portion is replaced with a non-conductive material. As such, the thickness of the local portion is kept and the strength of the local portion is ensured.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
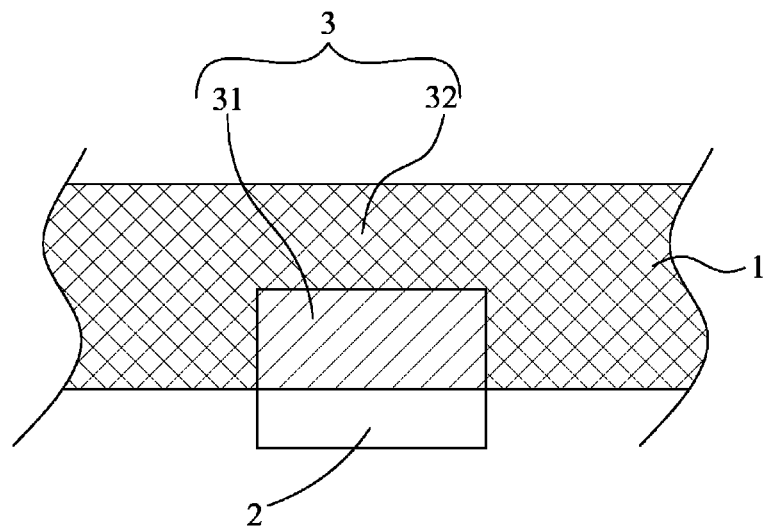
FIG. 1 is a schematic view showing a casing having a local portion located adjacent to a wireless device according to a first embodiment of the present invention, wherein the embodiment discloses the local portion includes a non-conductive layer and a conductive composite material layer, and the non-conductive layer is closer to the wireless device than the conductive composite material layer.
Figure 2:
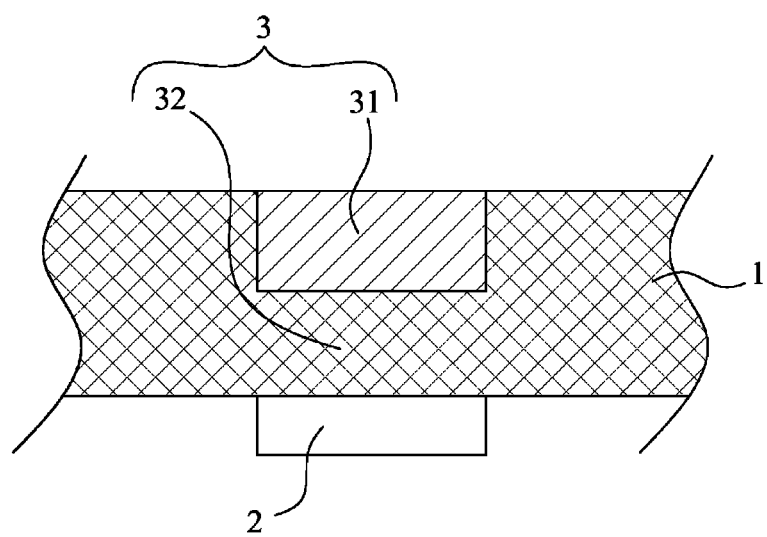
FIG. 2 is a schematic view showing an alternative arrangement of FIG. 1, wherein the embodiment discloses the conductive composite material layer is closer to the wireless device than the non-conductive layer.

Referring to FIGS. 1 and 2, a casing according to a first embodiment of the present invention includes a main body 1 made of a conductive composite material and a local portion 3. The portion of the casing that is located by a wireless device 2 is defined as the local portion 3. The local portion 3 includes a conductive composite material layer 32. The conductive composite material layer 32 is made of a conductive composite material. The thickness of the conductive composite material layer 32 is reduced to be thinner than a thickness of the main body 1 that is immediately adjacent to the conductive composite material layer 32. Moreover, signal emitting and signal receiving of the wireless device is not affected by the thickness of the conductive composite material layer 32 of the local portion 3. A part of the local portion 3 that has a thickness thinner than a thickness of the adjacent main body 1 is filled with a non-conductive layer 31. The non-conductive layer 31 is tightly connected with the conductive composite material layer 32 of the local portion 3 and the main body 1 that is immediately adjacent to the non-conductive layer 31. As such, the thickness of the conductive composite material layer 32 of the local portion 3 is shortened, and the shortened portion is replaced with a non-conductive material. Therefore, not only the thickness and strength of the local portion 3 are ensured, but the shield effect of the conductive composite material to wireless signals is also reduced.

Figure 3:
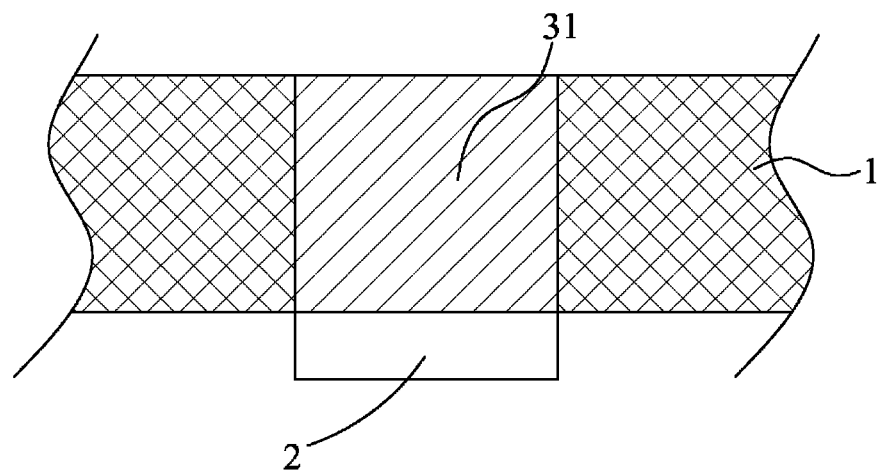
FIG. 3 is a schematic view showing a casing according to a second embodiment of the present invention, wherein the embodiment discloses the local portion is totally composed by the non-conductive layer.
Figure 4:
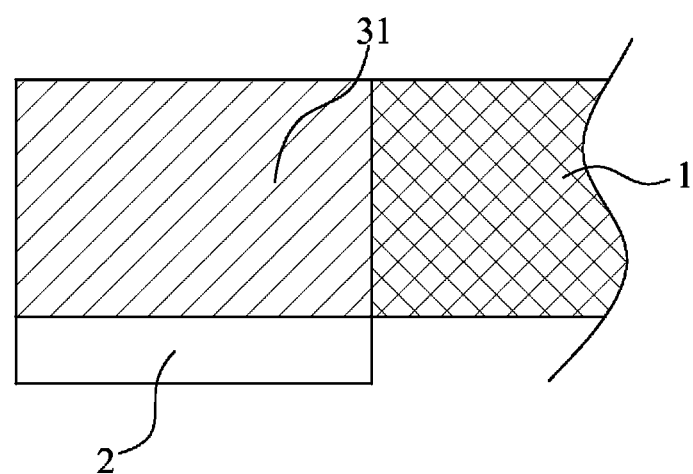
FIG. 4 is a schematic view showing an alternative arrangement of FIG. 3, wherein the embodiment discloses the local portion is located at a corner of the casing.

Referring to FIGS. 3 and 4, a local portion 3 according to a second embodiment of the present invention can be provided without any conductive composite material layer, and the entire local portion 3 is composed by the non-conductive layer 31. In other words, the thickness of the conductive composite material layer is reduced to nil, and is completely replaced with the non-conductive layer 31.

The local portion 3 is composed by the non-conductive layer 31 and the conductive composite material layer 32. So the thickness of the conductive composite material layer 32 of the local portion is reduced, and the reduced portion is replaced with the non-conductive layer 31.

The thickness of the local portion 3 is the same as or similar to the thickness of the main body 1 of the casing that is immediately adjacent to the local portion 3.

The conductive composite material can be carbon fibers. The structure of carbon fiber layer includes plain-woven, twill-woven and unidirectional-woven carbon fibers.

The material of the non-conductive layer 31 can be one layer or plural layers of glass fibers or other plastic materials.

The wireless device includes a wireless net card, Bluetooth, etc., used in a notebook computer or a mobile phone.

Several structures and manufacturing methods of the present invention are disclosed as follows:

(1) Referring to FIG. 1, the local portion has the non-conductive layer 31 and the conductive composite material layer 32. The non-conductive layer 31 is closer to the wireless device 2 than the conductive composite material layer 32. The manufacturing method includes the steps of milling the casing to form a cavity at an inner surface of the conductive composite material layer by a digital-controlled milling machine, the dimension of the cavity being corresponding to the non-conductive layer 31; filling and adhering the non-conductive material into the cavity, so a final product is obtained.

(2) As shown in FIG. 2, the local portion has the non-conductive layer 31 and the conductive composite material layer 32. The conductive composite material layer 32 is closer to the wireless device 2 than the non-conductive layer 31. The manufacturing method includes the steps of: stacking a structure as shown in FIG. 2, the non-conductive layer material generally using glass fibers; molding to form the product.

Figure 5:
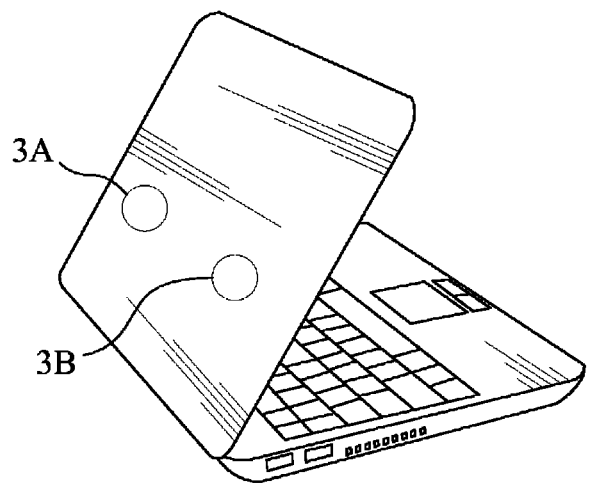
FIG. 5 is a schematic view illustrating the wireless device being installed at a middle portion of the casing of a notebook computer.
Figure 6:
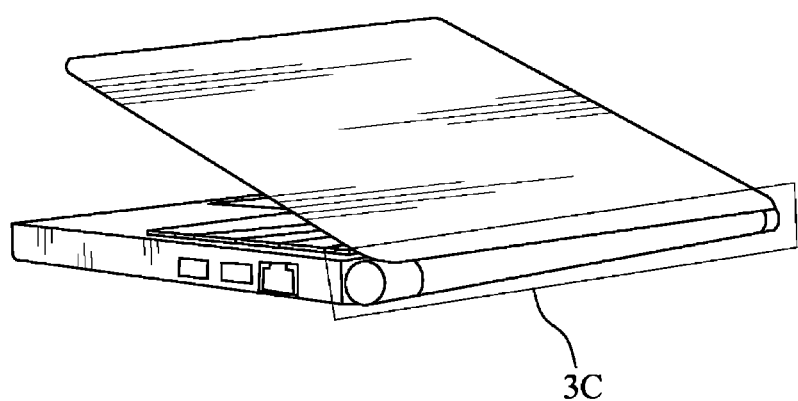
FIG. 6 is a schematic view illustrating the wireless device being installed at a rotation shaft of the casing cover of a notebook computer.
Figure 7:
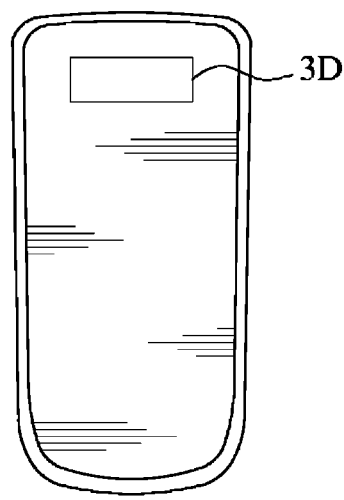
FIG. 7 is a schematic view illustrating the wireless device being installed at an upper middle portion of the casing of a mobile phone.
Figure 8:
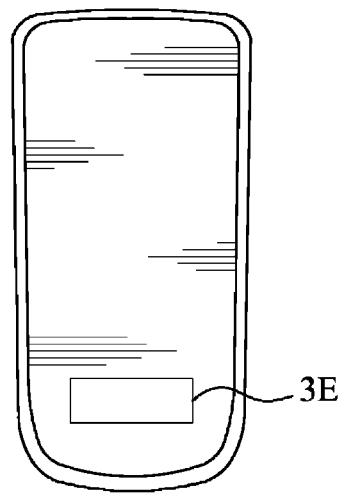
FIG. 8 is a schematic view illustrating the wireless device being installed at a lower middle portion of the casing of a mobile phone.
Figure 9:
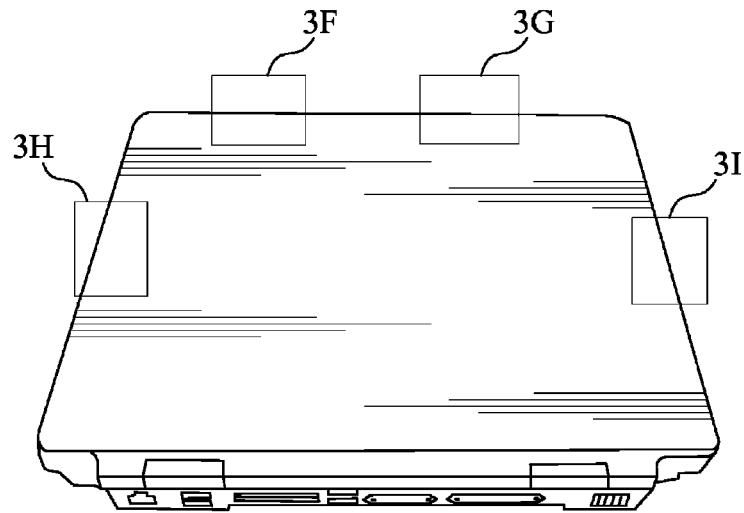
FIG. 9 is a schematic view illustrating the wireless devices being installed at edges of the casing of notebook computer.
Figure 10:
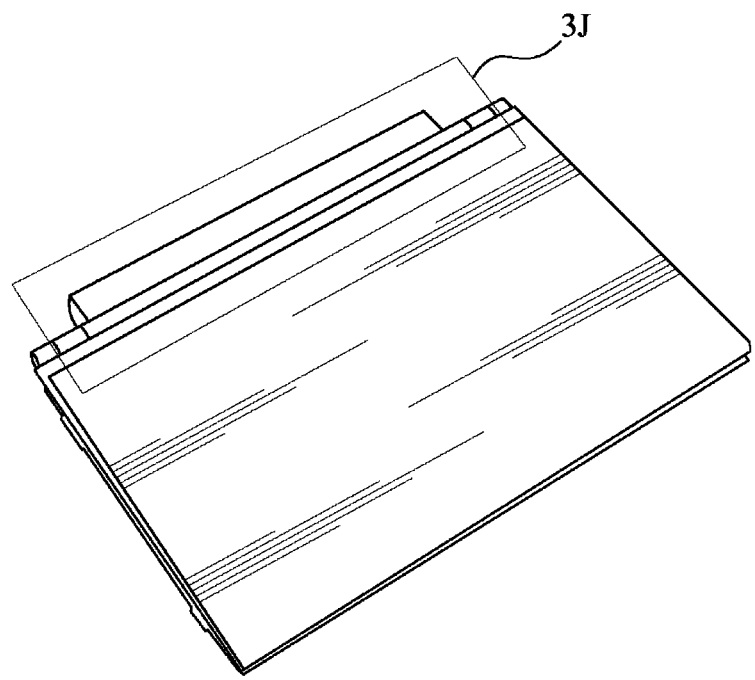
FIG. 10 is a schematic view illustrating the wireless device being installed an edge of the casing and at a rear side of the top cover of a notebook computer.

(3) Referring to FIGS. 3 and 4, the local portions 3 include the non-conductive layers 31 only. The first manufacturing method comprises the steps of milling the casing to form a cavity at the conductive composite material layer by a digital-controlled milling machine, the dimension of the cavity being corresponding to the non-conductive layer 31; filling and adhering the non-conductive material into the cavity. Thus a final product is obtained. The second manufacturing method includes the steps of: stacking a structure as shown in FIG. 3 or 4, the non-conductive layer material generally using glass fibers; applying a thermal-forming to form the product. Referring to FIG. 5, the wireless devices are installed at a middle portion of the casing of a notebook computer, and cross sectional structures of the locations 3A and 3B in FIG. 5 are as shown in FIG. 3. Referring to FIG. 6, the wireless device of a notebook computer is installed at a rotation shaft of the casing cover, a cross sectional structure of the location 3C in FIG. 6 is as shown in FIG. 3. Referring to FIG. 7, the wireless device of a mobile phone is installed at an upper middle portion of the casing of a mobile phone, a cross sectional structure of the location 3D in FIG. 7 is as shown in FIG. 3. Referring to FIG. 8, the wireless device is installed at a lower middle portion of the casing of a mobile phone, a cross sectional structure of the location 3E in FIG. 8 is as shown in FIG. 3. In FIG. 9, the wireless devices of notebook computer are installed at edges of the casing of a notebook computer, and cross sectional structures of the location 3F, 3G, 3H and 3I in FIG. 9 are as shown in FIG. 4. Referring to FIG. 10, the wireless device is installed at an edge of the casing and at a rear side of the top cover of a notebook computer, a cross sectional structure of the location 3J in FIG. 10 is as shown in FIG. 4.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A casing having a main body made of a conductive composite material and a local portion located adjacent to a wireless device;

wherein the local portion comprises a conductive composite material layer and a non-conductive layer, a thickness of the conductive composite material layer is reduced to be thinner than a thickness of the main body that is immediately adjacent to the conductive composite material layer, signal emitting and signal receiving of the wireless device is not affected by the thickness of the conductive composite material layer of the local portion, the thickness of the conductive composite material layer of the local portion is shortened, and the shortened portion is replaced with a non-conductive material for forming the non-conductive layer, a part of the local portion that has a thickness thinner than a thickness of the adjacent main body is filled with the non-conductive layer, the non-conductive layer is tightly connected with the conductive composite material layer of the local portion and the main body that is immediately adjacent to the non-conductive layer.

2. The casing according to claim 1, wherein a total thickness of the local portion is the same as the thickness of the main body that is immediately adjacent to the local portion.

3. The casing according to claim 1, wherein a total thickness of the local portion is close to the thickness of the main body that is immediately adjacent to the local portion.

4. The casing according to claim 1, wherein the conductive composite material is carbon fibers.

* * * * *